(12) United States Patent
Rhein et al.

(10) Patent No.: US 10,926,692 B2
(45) Date of Patent: Feb. 23, 2021

(54) ILLUMINATED HANDLE DEVICE IN A RECEPTACLE WITH A LIGHT CONDUCTOR EMITTING LIGHT THROUGH A GAP BETWEEN THE HANDLE AND OPENING OF DOOR

(71) Applicant: Huf Hülsbeck & Fürst GmbH & Co. KG, Velbert (DE)

(72) Inventors: Michael Rhein, Mönchengladbach (DE); Bernd Reifenberg, Essen (DE)

(73) Assignee: Huf Hülsbeck & Fürst GmbH & Co. KG, Velbert (DE)

( * ) Notice: Subject to any disclaimer, the term of this patent is extended or adjusted under 35 U.S.C. 154(b) by 55 days.

(21) Appl. No.: 16/383,239

(22) Filed: Apr. 12, 2019

(65) Prior Publication Data

US 2019/0232861 A1 Aug. 1, 2019

Related U.S. Application Data

(63) Continuation of application No. PCT/EP2017/075300, filed on Oct. 5, 2017.

(30) Foreign Application Priority Data

Oct. 12, 2016 (DE) ...................... 10 2016 119 447.6

(51) Int. Cl.
*B60Q 1/26* (2006.01)
*E05B 85/10* (2014.01)
(Continued)

(52) U.S. Cl.
CPC ............ *B60Q 1/2669* (2013.01); *B60J 10/86* (2016.02); *E05B 17/10* (2013.01); *E05B 85/103* (2013.01);
(Continued)

(58) Field of Classification Search
CPC ........ B60Q 3/267; B60Q 1/2669; B60Q 3/62; F21S 43/235; F21S 43/236; F21S 43/237;
(Continued)

(56) References Cited

U.S. PATENT DOCUMENTS 6,164,805 A 12/2000 Hulse
8,419,246 B2 * 4/2013 Hayashi .................. B60Q 3/64
362/501
2012/0262937 A1 10/2012 Hayashi et al.

FOREIGN PATENT DOCUMENTS

CN 103282235 9/2013
DE 102016216384 7/2017
(Continued)

OTHER PUBLICATIONS

PCT International Patent Application No. PCT/EP2017/075300 filed Oct. 5, 2017 in the name of Huf Hülsbeck & Fürst GmbH & Co. KG, International Search Report and Written Opinion dated Jan. 31, 2018.

(Continued)

*Primary Examiner* — Robert J May
(74) *Attorney, Agent, or Firm* — Levine Bagade Han LLP

(57) ABSTRACT

The invention relates to a handle device (1) for a movable part (100), in particular a motor vehicle door (100), of a motor vehicle, which is designed with a carrier element (10), a holder (11) being formed on the carrier element (10), which receptacle can be arranged at an opening (101) in the movable part (100), wherein a door handle (20), in particular a level door handle, for actuating the movable part (100) is movably mounted on the carrier element (10), and wherein the door handle (20) is designed such that a front gap (S) can be set between the opening (101) in the movable part (100) and the door handle (20). For this purpose, it is provided in accordance with the invention that a light conductor (30) is
(Continued)

arranged on the carrier element (10) in order to indirectly illuminate the door handle (20) through the gap (S).

35 Claims, 4 Drawing Sheets

(51) Int. Cl.
    *E05B 17/10*     (2006.01)
    *F21S 43/249*     (2018.01)
    *F21S 43/245*     (2018.01)
    *F21S 43/237*     (2018.01)
    *F21S 43/241*     (2018.01)
    *B60J 10/86*     (2016.01)

(52) U.S. Cl.
    CPC .......... *E05B 85/107* (2013.01); *F21S 43/237* (2018.01); *F21S 43/241* (2018.01); *F21S 43/245* (2018.01); *F21S 43/249* (2018.01); *E05Y 2900/531* (2013.01)

(58) Field of Classification Search
    CPC ...... F21S 43/239; F21S 43/241; F21S 43/242; F21S 43/243; F21S 43/2454; F21S 43/247; F21S 43/249; F21S 43/251
    See application file for complete search history.

(56) References Cited

FOREIGN PATENT DOCUMENTS

| | | |
|---|---|---|
| EP | 3032013 | 6/2016 |
| FR | 2724613 | 3/1996 |
| FR | 2747971 | 10/1997 |
| JP | H08-318783 | 12/1996 |
| WO | WO 2016/041996 | 3/2016 |

OTHER PUBLICATIONS

Chinese Patent Application No. 201780052200.3 filed Sep. 4, 2012 in the name of Huf Hülsbeck & Fürst GmbH & Co. KG, Office Action dated Apr. 26, 2020.

\* cited by examiner

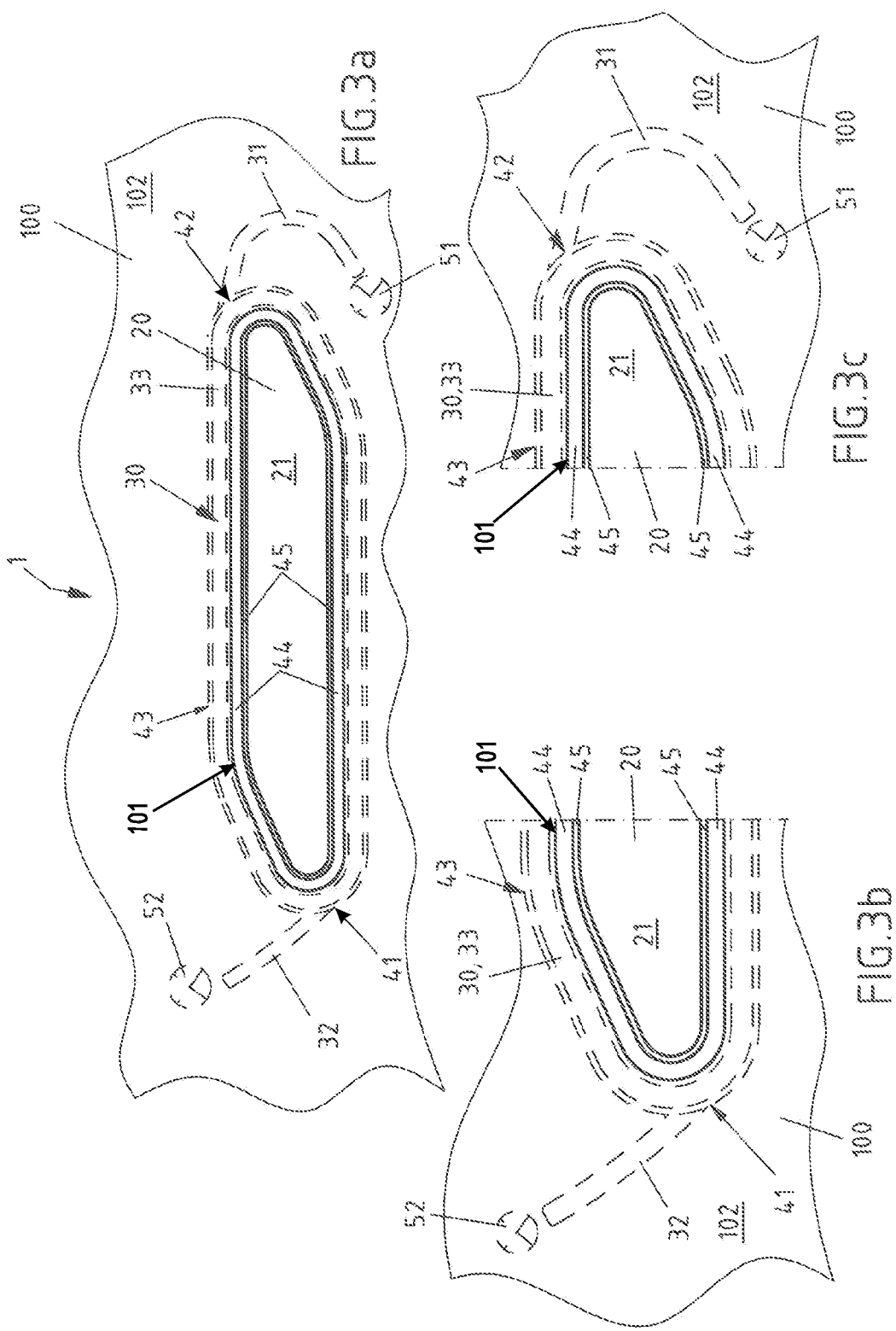

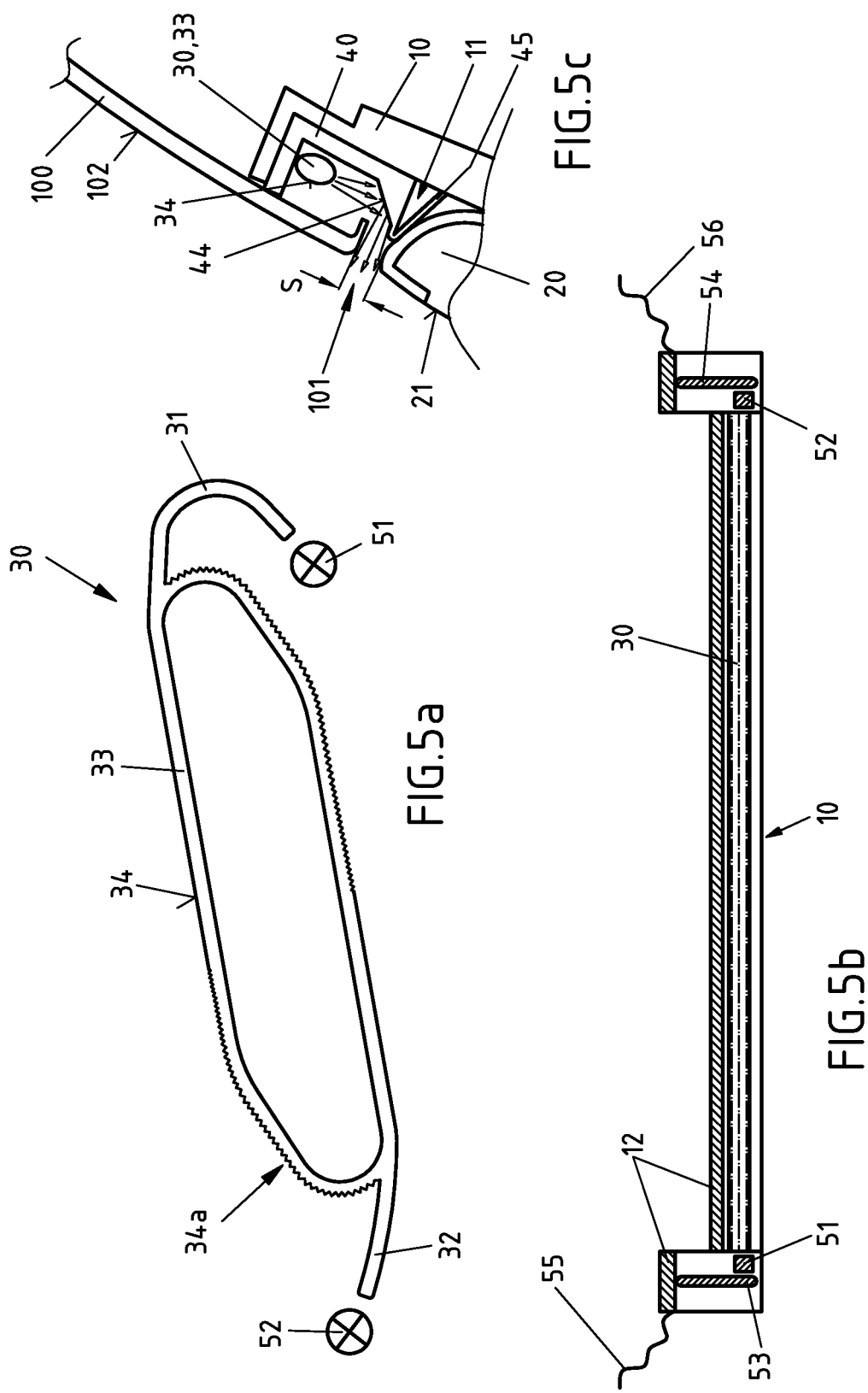

ILLUMINATED HANDLE DEVICE IN A RECEPTACLE WITH A LIGHT CONDUCTOR EMITTING LIGHT THROUGH A GAP BETWEEN THE HANDLE AND OPENING OF DOOR

CROSS-REFERENCE TO RELATED APPLICATIONS

This application is a continuation of International Application No. PCT/EP2017/075300, filed Oct. 5, 2017, which claims benefit of priority to German Patent Application No. 10 2016 119 447.6, filed Oct. 12, 2016, the content of each of which is incorporated herein by reference in its entirety.

BRIEF SUMMARY OF THE INVENTION

The invention relates to a handle device for a movable part, in particular a motor vehicle door, of a motor vehicle according to the preamble of the independent device claim, having a carrier element, a receptacle being configured on the carrier element which can be arranged at an opening in the movable part, a door handle, in particular a level door handle, for actuating the movable part being movably mounted on the carrier element, in particular in the receptacle, and the door handle being formed in such a way that a front gap can be set between the opening in the movable part and the door handle. Furthermore, the invention relates to a method for illuminating a door handle, in particular a level door handle, for a movable part, in particular a motor vehicle door, of a motor vehicle according to the preamble of the independent method claim.

There are various concepts for creating apron lighting in motor vehicles. For instance, a light source can be arranged in the exterior mirrors to illuminate the side apron of the vehicle downwards. In addition, it is also known that light sources are arranged in the exterior door handles, which also shine downwards to illuminate the side apron in the area of the vehicle doors. This significantly increases comfort when entering the vehicle at night.

However, there are also door handles which are at least for the most part recessed in the vehicle door and only extend for one actuation. With such door handles, reliable apron lighting can only take place when the door handle extends into its actuated position. However, level or partially retractable door handles are used on vehicle doors to prevent the door handle from sticking out, which reduces the risk of accidents to pedestrians and improves the aerodynamics of the vehicle. With such door handles, it is difficult to release the apron lighting in or on the door handle.

It is therefore the object of the present invention to provide a handle device for a movable part of a motor vehicle, in particular a motor vehicle door, which at least partially overcomes the above-mentioned disadvantages from the state of the art. In particular, the present invention is intended to provide a handle device which is easy to use and has improved user comfort. The object of the present invention is preferably to enable apron lighting by the handle device, in particular in a retracted, level mounted rest position of a door handle, even with a partially recessed or level door handle.

This object is solved according to the invention by a device with the characteristics of the independent claim 1, in particular from the characterizing part, and by a method according to the invention according to the independent claim. In the dependent claims preferred further evidence of the invention. Factors are listed with respect to the individual embodiments of the device according to the invention and the method according to the invention may be combined with each other in such a way that, with respect to the disclosure of the embodiments of the device according to the invention and the method according to the invention, reference is or may always be made to each other.

The handle device according to the invention for a movable part according to the preamble of the main claim provides that a light conductor is arranged on the support element to illuminate the door handle preferably indirectly through the gap. The gap is used, among other things, to move the door handle, in particular to transfer the door handle from a rest position to an actuated position. Indirect lighting means, in the sense of the invention, that no direct light source is used to radiate light through the gap. According to the invention, the light used to illuminate the door handle is first sent through the light conductor. Afterwards, however, the light is not emitted from the ends of the light conductor, but only to a reduced extent from the side, in particular from a lateral surface of the light conductor. Furthermore, the light emitted or refracted at the outer surface of the light conductor is reflected at least once by the carrier element or its components, in particular reflected diffusely. The light reflected or reflected by the support element or its components is thus further reduced and preferably scattered, so that the light that is finally emitted from the gap has a reduced light intensity and is uniform. Preferably the door handle itself is configured to be free of light sources.

The idea behind the invention is that the gap between the level door handle and the vehicle sheet is used to indirectly radiate light from a light source. For this purpose, a preferably circumferential light conductor is arranged in the area of the gap, which can be illuminated in particular by two light sources. However, so that the light from the light conductor does not radiate directly through the gap but from the side of the vehicle door, the light conductor can be positioned below an outside of the moving part so that the light guide can be concealed from the outside and no light can radiate directly through the gap. The outer surface of the light conductor can become rougher and rougher the further the light conductor moves away from the light source(s), in order to allow a reduced part of the coupled light to emerge evenly from the light conductor. The light refracted on the outer surface of the light conductor is then reflected, especially diffusely reflected, on a reflection surface on the carrier element, e.g. on a sealing element. The reflective surface does not need to be fully mirrored, but can use the albedo effect to diffusely reflect the incident light, which was refracted at the surface of the light conductor, and preferably scatter it. The reflective surface can be kept in white or yellow, for example. To a further reduced extent, such light, once refracted and once diffusely reflected, may exit through the gap to the outside, whereby the light exiting through the gap is emitted with a low light intensity and more uniformly than directly from the light source(s). This enables discreet and uniform illumination of the handle device, especially the door handle, even in the retracted, level rest position of the door handle. This makes the handle device easy to operate, even in the dark, which significantly improves the user comfort of the handle device. It is advantageous that no person is dazzled to the side by the inventive handle device, since the light does not escape directly.

Furthermore, the invention may provide that the door handle may be movably mounted between at least two positions, namely: a rest position in which the door handle is received in the receptacle to close with an outer surface of the door handle the opening in the movable part substantially level with an outside of the movable part, and an actuating position in which the door handle is extended from the receptacle to actuate the movable part. This enables a handle device which, in the rest position of the door handle, can meet high requirements in terms of configuration and aerodynamics and which, in the operating position, can enable simple and intuitive actuation of the moving part in order to actuate, for example open, the moving part. It is also conceivable that the door handle itself radiates light to the apron lighting and has its own light source for this. Instead of its own light source in the door handle, the underside of the door handle can be reflective so that the light from the gap also produces good apron lighting.

Furthermore, the invention may provide that the light conductor may be arranged along the gap. Thus, the advantage can be achieved that a light can be directed through the gap between the flush door handle and the motor vehicle sheet in order to indirectly illuminate the door handle along the gap.

Furthermore, it is conceivable within the scope of the invention that the light conductor can be arranged underneath an outside of the moving part. Thus, it can be advantageously ensured that the light which emerges from the light conductor, in particular from a circumferential surface of the light conductor, is not emitted directly through the gap but is reflected at least once at the support element, in particular at the sealing element. The light intensity of the light emitted through the gap can thus be reduced to allow discreet illumination of the handle, especially the door handle.

In addition, the invention enables for the light conductor to be arranged along an outer surface of the door handle, in particular around the outer surface of the door handle, preferably circumferentially in the receptacle. The advantage of this is that the contour of the handle can be highlighted by the indirect light emitted to make it easier to find the door handle, especially in the dark. It is advantageous to use the holder in the support element to accommodate the light conductor, especially to arrange it circumferentially along the holder.

Furthermore, it is conceivable within the scope of the invention that the light conductor may have one, in particular closed, loop area and/or at least one, in particular two, coupling areas extending from the loop area. The advantage of a closed loop area is that the light conductor can thus surround an outer contour of the door handle in order to make the, preferably entire, contour of the door handle visible. At least one, and in particular two, of the loop areas can have the advantage that they can be moved to a location where there is space for a light source to inject a light into the light conductor. Two coupling areas can have the advantage that the light can be coupled into the light conductor from two sides so that the light can be distributed evenly in the light conductor.

Furthermore, at least one, in particular two, light sources can be provided in order to couple a light into the light conductor, preferably into the at least one, in particular two coupling areas. A light source can be advantageous because a compact design of the handle device can be achieved with only a few components. Two light sources can have the advantage that sufficient light can be provided along the entire light guide, in particular along the loop area, to uniformly illuminate the contour of the door handle, preferably the entire contour. With two light sources, it is also possible to distribute the light evenly through the light conductor, especially through the loop area, thus ensuring uniform illumination of the door handle.

It is also conceivable that at least one, in particular two light sources in the form of an LED, preferably an OLED, can be designed. LEDs are inexpensive and simple components that can be easily mounted and operated economically, especially with little electrical energy. OLEDs can be advantageous because they can have a low luminance to provide discreet lighting.

The invention may also provide that the light conductor may comprised of a bundle of glass fibers or of a plastic, in particular plexiglass (PMMA) or polycarbonate. The advantage of glass fibers is that they are resistant to ageing and weathering, chemically resistant and have a high modulus of elasticity. The glass fibers can have a relatively high optical density in the core, so that the light can be transported over longer distances in the core of the light conductor despite a curvature of the light conductor. The density of the light coupled into the light conductor can be increased or flexibly adjusted by a bundle of glass fibers. The advantage of a light conductor made of plastic can be that the light conductor can be manufactured simply and inexpensively. A further advantage of a light conductor made of plastic can be that it can allow the coupled light to exit evenly from the lateral surface of the light conductor. A light conductor made of Plexiglas has good flow properties, which can enable simple and inexpensive production of the light conductor. Nevertheless, a light conductor made of Plexiglas can exhibit high mechanical strength, high light transmission, high resistance to weathering and heat deformation. In addition, the light conductor made of plastic, especially plexiglass, can be easily colored to provide a suitable refractive index in the light conductor. Furthermore, it is conceivable that the light conductor can be in the form of a light tube or a hollow tube. Thus, the light can be transported through the air in the tube and not through a material. Finally, a part of the light can be reflected into the inside of the tube by a lateral surface of the tube and a part can be refracted by the lateral surface of the tube to leave the tube. The advantage of a light tube can also be that the light can be guided through the air over longer distances without being absorbed in the material. This allows uniform illumination of the door handle, even with only one light source, especially along the entire contour of the door handle.

Furthermore, the light guide can be configured in such a way that at least part of a light coupled into the light conductor is emitted laterally, preferably from a lateral surface of the light conductor. The advantage of this is that a small part of the coupled light can gradually escape along the light conductor. Thus, a light can be provided for the illumination of the door handle along the entire gap, in particular, with a reduced intensity than directly from the light source.

Furthermore, the invention may provide that the light conductor may have a lateral surface structure, in particular an inhomogeneous surface structure, on a lateral surface in order to partially reflect a light coupled into the light conductor inwards into the light conductor and to partially exit it outwards from the light conductor. Thus, the light emission from the lateral surface of the light conductor can be influenced by the increasing distance to a light source, in particular increased, in order to achieve uniform illumination of the door handle.

Furthermore, the invention may provide that the surface structure of the light conductor may be configured as a mirroring and/or a roughening and/or a notched structure and/or a serrated structure on a cladding surface of the light conductor. Thus, it can enable in a simple way that a light coupled into the light conductor is reflected partly inwards into the light conductor and partly outwards out of the light conductor. In order to achieve an inhomogeneous surface structure of the light conductor, the reflective layer may become thinner as the distance to a light source or light sources increases. A roughening of the outer surface can again be coarser with the increasing distance to the light source(s) in order to allow sufficient light to escape from the outer surface of the light conductor despite a decreasing light intensity as it passes through the light conductor. A notched structure and/or a serrated structure on the outer surface of the light guide can also be increasingly coarser or more pronounced in order to enable uniform light emission from the outer surface of the light guide despite decreasing light intensity with increasing distance from the light sources.

In addition, it is conceivable that the surface structure of the light conductor may be inhomogeneous in such a way that light coupled into the light conductor is emitted at a growing distance from at least one light source to a greater extent than is reflected. The light intensity of the light coupled into the light conductor decreases as it passes through the light conductor. Due to the surface structure of the light conductor becoming rougher and/or coarser with the distance from the light source, it can be advantageously enable that sufficient light can emerge evenly from the outer surface of the light conductor despite the decreasing light intensity over the length of the light conductor.

Furthermore, the carrier element, in particular in the region of the receptacle, can be configured in such a way as to reflect a light at least in part, preferably with an albedo value of 0.5 to 0.9, in particular preferably of 0.7 to 0.9, in particular to reflect it diffusely. Thus, the light emitted from the light conductor, especially from the lateral surface of the light conductor, can be reflected in order to allow the light to exit from the side of the door handle and through the gap. The advantage of diffusely reflected light can be that the light can be scattered and evenly distributed in the room.

Furthermore, a sealing element can be provided in the holder in order to seal the gap at least in the rest position of the door handle, it being possible in particular for the sealing element to be arranged along the gap. Thus, the handle device can be protected from weather influences and in particular from moisture, such as rainwater. The sealing element along the gap can provide reliable protection along the particularly entire contour of the door handle.

In addition, the sealing element may have a sealing lip, in particular an unwound lip, which, at least in the rest position of the door handle, may elastically rest on the door handle. The sealing lip thus prevents moisture from penetrating into the inside of the handle. The sealing lip can itself be made of rubber or silicone, for example, and can therefore be flexibly and geometrically adapted to the door handle. The sealing element may have a different plastic material than the sealing lip in order to be dimensionally stable. The sealing lip can be manufactured with the sealing element as a material-locking component, especially as a 2-component injection-molded part.

Furthermore, it is conceivable that the sealing element can be arranged along the lateral surface of the door handle, in particular circumferentially around the lateral surface of the door handle, and/or circumferentially in the holder. This provides reliable protection against the effects of the weather and, in particular, moisture, such as rainwater, especially along the entire lateral contour of the door handle or along the entire circumference of the holder.

In addition, the sealing element can be configured in such a way that the light conductor can be form and/or force-fitted and/or material-fitted. Thus, a simple and yet reliable fastening of the light conductor to the carrier element can be achieved, on which the sealing element can be arranged.

It is also conceivable that the sealing element may have a guide holder for the light conductor, in particular for a loop area of the light conductor. Thus, the light conductor can be positioned protected in the guide holder. The guide holder of the light conductor, in particular the loop area of the light conductor, can also be used to guide the light conductor around the lateral contour of the door handle.

Furthermore, it is conceivable that the sealing element may have at least one, in particular two openings for the at least one, in particular two coupling areas of the light conductor. This means that the light conductor with the coupling area(s) can be routed outside the guide holder in order to guide the light conductor to the light source(s).

Within the scope of the invention it may be provided that the sealing element may have a reflection surface in order to reflect, in particular diffusely reflect, at least in part, preferably with an albedo value of 0.5 to 0.9, in particular preferably of 0.7 to 0.9, a light which emerges in particular laterally from the light conductor. Thus, the light emerging from the light conductor, in particular from the lateral surface of the light conductor, can be reflected to a reduced extent by the reflection surface of the sealing element and scattered in order to allow the light to exit laterally at the door handle and through the gap with a low light intensity and uniformly. Alternatively, or additionally, it is conceivable that the reflection surface may have a fluorescent coating that can gradually emit absorbed light again.

Furthermore, in the context of the invention it is possible that the sealing element, in particular the reflecting surface, may have a white and/or yellow color, whereby in particular the reflecting surface of the sealing element may be colored white and/or yellow. In other words, the sealing element can be made of a white and/or yellow material, e.g. plastic, or the reflecting surface of the sealing element can be white and/or yellow. A white and/or yellow color has a relatively high albedo value, but weakens the light sufficiently to allow discreet illumination of the door handle.

The sealing element may be made of a plastic material, in particular an elastic material. With the help of a plastic, a desired albedo value can be set to reflect only a certain portion of the incident light. In addition, a plastic can be easily colored.

Furthermore, the inventive object is solved by a method of lighting a door handle, in particular a level door handle, for a movable part, in particular a motor vehicle door, of a motor vehicle according to the independent method by means of a handle device described above. The handle device comprises a support element and a light conductor, wherein a holder is formed on the support element which can be arranged at an opening in the movable part, wherein the door handle for actuating the movable part is movably mounted on the support element, in particular in the holder, and wherein the door handle is formed in such a way that a frontal gap can be set between the opening in the movable part and the door handle. For this purpose, the method according to the invention provides that the door handle is indirectly illuminated through the gap. The advantage of indirect lighting is that no direct light is emitted from the side of the vehicle door. The indirectly emitted light also has a reduced light intensity, making the illumination of the handle device discreet and pleasant. In addition, the process according to the invention achieves the same advantages as the handle device according to the invention, which are described in detail above. In order to avoid repetitions, full reference is made to it in this document.

BRIEF DESCRIPTION OF THE SEVERAL VIEWS OF THE DRAWINGS

According to the invention, the features from the description and the claims to the inventive device as well as to the inventive method may be essential for the invention both individually and in various combinations. Further measures to improve the invention are described below together with the description of the preferred embodiments of the invention using the figures. It is shown:

In the figures, the same reference signs are used for the same technical characteristics even for different embodiments.

DETAILED DESCRIPTION OF THE INVENTION

Figure 1:
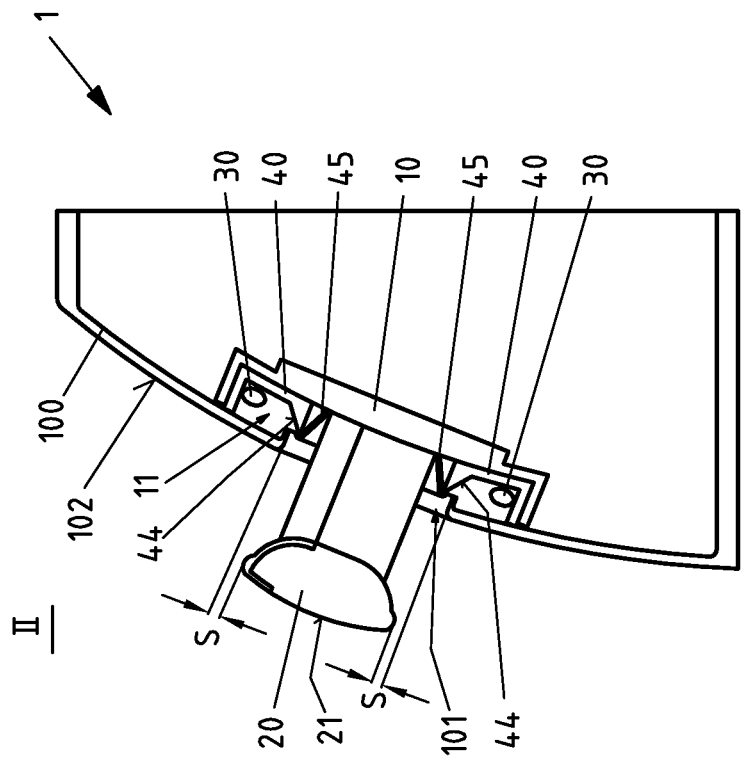
FIG. 1 an i handle device according to the invention in the rest position of a door handle, FIG. 2 the handle device according to the invention in an operating position of the door handle, FIG. 3a top view of the d handle according to the invention, FIG. 3b left top view of a left part of the handle device according to the invention, FIG. 3c top view of a right part of the handle according to the invention, FIG. 4a a top view of a sealing element, FIG. 4b a rear view of the sealing element, FIG. 5a a representation of a light conductor, FIG. 5b a sectional view of a support element with the light conductor in a vehicle longitudinal direction, and FIG. 5c a sectional view of the handle device according to the invention in a transverse direction of the vehicle.
Figure 2:
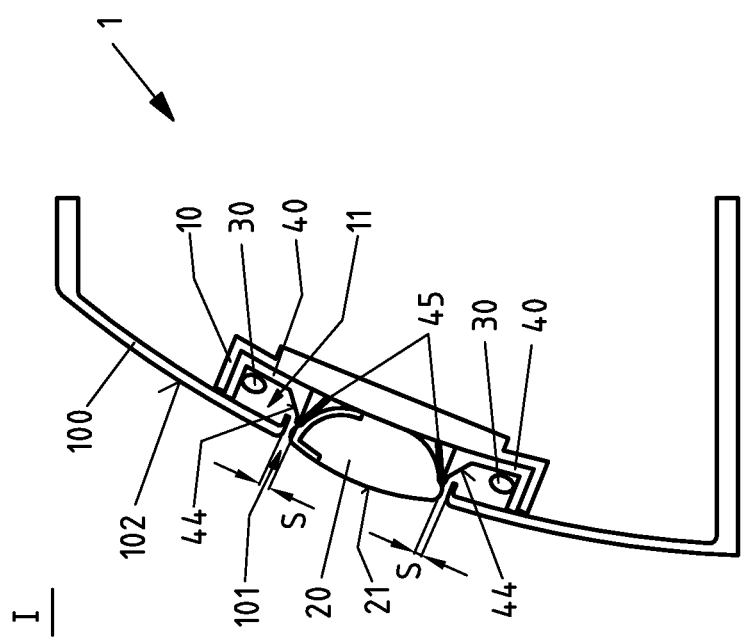

FIGS. 1 and 2 show a handle device 1 according to the invention for a movable part 100 of a motor vehicle in the form of a motor vehicle door 100. The handle device 1 is configured with a carrier element 10 in which a receptacle 11 for a door handle 20 is configured. The support element 10 can be positioned at an opening 101 in the moving part 100 with the receptacle 11. The door handle 20 is movably mounted on the support element 10, in particular in the receptacle 11. The door handle 20 is a level door handle 20 which, in a rest position I shown in FIG. 1, is accommodated in the receptacle 11 in order to close the opening 101 in the movable part 100 substantially level with a lateral surface 21 of the door handle 20 to a lateral surface 102 of the movable part 100 with a lateral surface 21 of the door handle 20. In an operating position II, shown in FIG. 2, the door handle 20 is extended from the receptacle 11 to operate the moving part 100, for example to open it.

As further shown in FIG. 1, the door handle 20 is configured in such a way that a front gap S is adjustable between the opening 101 in the movable part 100 and the door handle 20, at least in the rest position I of the door handle 20. In operating position II of the door handle 20, the gap S becomes even wider. According to the invention, a light guide 30 is arranged on the support element 10, preferably below the outside 102 of the moving part 100, in order to indirectly illuminate the door handle 20 through the gap S.

As FIGS. 3a to 3c show, no direct light source is used in the area of gap S to radiate a light directly from the light source through gap S. The light conductor 30, shown in detail in FIG. 5a below, and the sealing element 40, shown in FIGS. 4a and 4b below, are used to indirectly illuminate the door handle 20. A light from two light sources 51, 52 shown in FIGS. 3a and 5a is guided through the light conductor 30. The light coupled into the light guide 30, however, is not emitted from the ends of the light guide 30, but laterally, i.e. from a mantle surface 34 of the light guide 30, only to a reduced extent, the remaining part of the light is guided further through the light conductor 30 until it can gradually emerge from the mantle surface 34 of the light conductor 30. Furthermore, the light refracted on the surface 34 of the light conductor 30 is reflected once by the sealing element 40, in particular diffusely reflected, preferably using the albedo effect. This further reduces the light coming out of gap S and diffuses it, preferably diffusely, to provide uniform and discreet illumination of handle 1, in particular door handle 20, as shown in FIGS. 3a to 3c. FIGS. 3b and 3c also show that a light is introduced laterally into the light conductor 30, whereby the respective light source 51, 52 does not appear at all through the gap S. The light source 51, 52 is not visible at all through the gap S, but through the light conductor 30. The light sources 51, 52 are positioned so that as much light as possible is coupled into the light conductor 30.

Figure 4A:
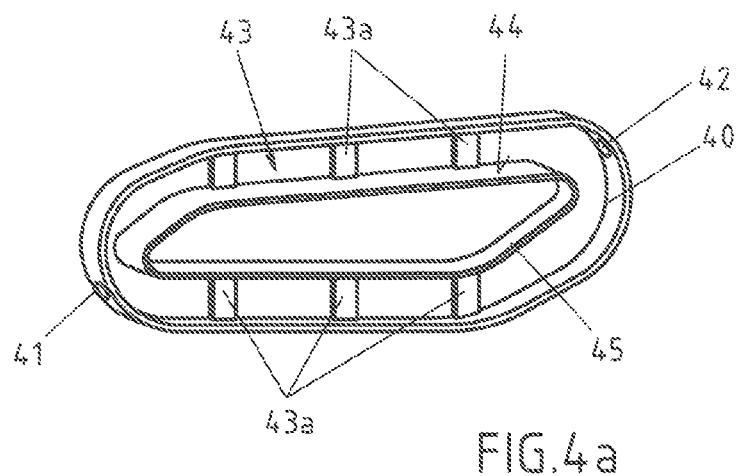
Figure 4B:
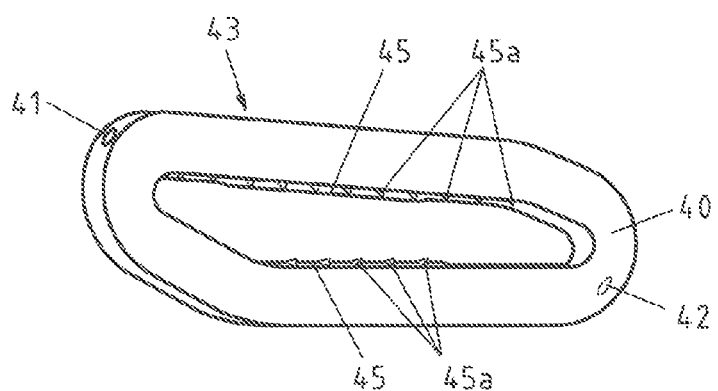

FIGS. 4a and 4b show a sealing element 40, which is arranged in the receptacle 11 on the support element 10. The sealing element 40 serves to seal the receptacle 11 in the area of the gap S so that no moisture can enter the interior of the handle device 1 between the sealing element and the door handle 20, at least in the rest position I of the door handle 20 shown in FIG. 1. The sealing element 40 is arranged along the gap S and surrounds a lateral contour of the door handle 20. In other words, the sealing element 40 is arranged circumferentially in the receptacle 11.

As FIGS. 1, 2, 4a and 4b show, the sealing element 40 has an unwound sealing lip 45 which, in the rest position I of the door handle 20, rests elastically on the door handle 20 (see FIG. 1). Thus, the sealing lip 45, at least in the rest position I of the door handle 20, prevents moisture from penetrating inside the handle device 1.

Furthermore, a guide holder 43 for the light conductor 30, in particular for a loop region 33 of the light conductor 30, is formed on the sealing element 40, the loop region 33 of the light conductor 30 being shown in FIG. 5a. The guide holder 43 can be configured in such a way that the light conductor 30 can be form and/or force fitting received. Guide ribs 43a can be used for this purpose, which can be configured as latching and/or clamping elements for the light conductor 30, in particular for the loop area 33 of the light conductor 30. Thus, the light conductor 30 can be held reliably in the guide holder 43. The guide holder 43 also allows the light conductor 30, in particular the loop area 33 of the light conductor 30, to be uniformly adapted to the lateral contour of the door handle 20.

Two openings 41, 42 are provided on the side of the sealing element 40 for two corresponding coupling areas 31, 32 of the light conductor 30, whereby the coupling areas 31, 32 are shown in FIG. 5a. Through these openings 41, 42 in the sealing element 40, the coupling areas 31, 32 can be led outwards from the guide holder 43 to the two light sources 51, 52 shown in FIGS. 3a and 5a.

A reflection surface 44 is formed on the inside in the guide holder 43 of the sealing element 40 and aligned to the door handle 20, which essentially merges into the sealing lip 45. The reflection surface 44 serves to reflect a light, which preferably emerges laterally from the light guide 30, at least in part, preferably with a specific albedo value, for example from 0.5 to 0.9, or particularly preferably from 0.7 to 0.9, in particular to reflect it diffusely. Thus, the light emerging from the light conductor 30, in particular from the lateral surface 34 of the light conductor 30, can be reflected at the reflection surface 44 of the sealing element 40 in order to reduce and diffuse the light and to allow it to exit laterally at the door handle 20 and through the gap S. The light is then reflected at the reflection surface 44 of the sealing element 40. The entire sealing element 40 can be made of a white and/or yellow material, e.g. plastic, or only the reflecting surface 44 of the sealing element 40 can be colored white and/or yellow in order to achieve an albedo effect. A white and/or yellow color has a relatively high albedo value, but reduces the light intensity sufficiently to allow discreet illumination of the door handle 20, as shown in FIGS. 3*a* to 3*c*. The sealing element 40 may be made of a plastic material, in particular an elastic material. A desired albedo value can be set by selecting a suitable plastic which can also be easily dyed.

As FIG. 4*b* also shows, several support webs 45*a* are provided on the underside of the sealing element 40 in the area between the sealing lip 45 and an underside of the reflecting surface 44, which can hold the unwound sealing lip 45 in an adjacent position to the door handle 20 in the rest position I of the door handle 20.

FIG. 5*a* shows the light conductor 30, which can be illuminated by two light sources 51, 52. So that the light from the light conductor 30 can radiate from the side of the vehicle door 100, rather than directly through the gap S, the light conductor 30 is positioned below the outside 102 of the vehicle door 100, as shown in FIG. 5*c* below. Thus, the light guide 30 can be concealed from the outside and not emit any light directly through the gap S, not even from the surface 34.

The light conductor 30 has a, preferably closed, loop area 33 and two coupling areas 31, 32 outgoing from loop area 33, through each of which a light from a light source 51, 52 is coupled into the light conductor 30. The coupling areas 31, 32 are moved to a location in the handle device 1, where the respective light source 51, 52 is arranged on the support element 10, e.g. to two bearing positions E1, E2 for the door handle 20, as shown in FIG. 5*b*. Preferably, two coupling areas 31, 32 and two light sources 51, 52 are used to ensure that the light can be provided in sufficient quantity to different locations in the light conductor 30 despite the decreasing intensity as it passes through the light conductor 30.

A circumferential surface 34 of the light guide 30 is formed on the outside of the light guide 30, in particular on the loop area 33. With the distance from the respective light source 51, 52, the lateral surface 34 can be made rougher and rougher in order to allow the coupled light to escape from the lateral surface 34 in sufficient quantity despite the increasing distance from the light source 51, 52. In the embodiment of FIG. 5*a*, the shell surface 34 is provided with an inhomogeneous surface structure 34*a* in the form of a notch structure 34*a*. The surface structure 34*a* becomes coarser and more pronounced with the increasing distance from the respective light source 51, 52, so that more and more light can leave the light guide 30. Alternatively, it is conceivable that the surface structure 34 of the light conductor 30 can be formed as a mirroring and/or a roughening and/or a serrated structure on the lateral surface 34 of the light conductor 30. In order to achieve an inhomogeneous surface structure 34*a* of the light conductor 30, the mirror layer can be thinner and thinner as the distance to the respective light source increases (51, 52), so that as the distance from the light source 51, 52 increases, more and more light can escape from the lateral surface 34 of the light conductor 30. A roughening of the lateral surface 34 can in turn be coarser with the increasing distance to the respective light source 51, 52, in order to allow sufficient light to escape from the lateral surface 34 of the light conductor 30 despite a decreasing light intensity as it passes through the light conductor 30.

FIG. 5*b* also shows that the light conductor 30 can be embedded in the holder 11 on the support element 10. The sealing element 40 is not shown for reasons of simplicity. Two bearing positions E1, E2 for door handle 20 are indicated on the left and right of support element 10. The light sources 51, 52 can be arranged at these bearing positions E1, E2. In addition, two circuit boards 53, 54 for the light sources 51, 52 can be arranged at the bearing points 1, E2, from which two cables 55, 56 can exit in order to supply the light sources 51, 52 with electrical energy. In the rear area, at the bearing points E1, E2, from where the cables 55, 56 leave, and at the rear area of the support element 10, according to a configuration of the invention, a sealing compound 12 can be provided, which can seal the handle device 1 in the direction of the interior of the motor vehicle.

Finally, FIG. 5*c* shows in an enlarged representation how a light is emitted indirectly through the gap S (The light is then transmitted through the gap S to the surface of the object). The light conductor 30, especially the loop area 33 of the light conductor 30 is shown in section. At the lateral surface 34 of the light conductor 30, a partial light emission of the coupled light gradually occurs, which is refracted at the lateral surface 34 of the light conductor 30. The light is then reflected at the reflection surface 44 of the sealing element 40, in particular diffusely reflected. The reflective surface 44 does not need to be fully mirrored, but can use the albedo effect to diffusely reflect and preferably scatter the incident light, which has left the lateral surface 34 of the light guide 30, only to a reduced extent. The reflective surface 44 can be kept in white or yellow, for example. To an even more reduced extent, such light, once refracted and once diffusely reflected, can exit through the gap S to the outside. This light emitted indirectly through the gap S has a lower light intensity and is distributed more evenly than the light emitted directly by the light source 51, 52. This enables discreet and uniform illumination of handle 1, in particular door handle 20, even in the retracted, flush rest position I of door handle 20. This makes the handle 1 easy to operate, even in the dark, which considerably improves the user comfort of the handle 1. Advantageously, no person is blinded to the side by the handle device according of this invention.

The preceding explanation of the embodiment describes the present exclusively according to the invention in the context of examples. Of course, individual features of the present invention can be freely combined with each other without leaving the scope of the present invention/claims, if technically reasonable.

We claim:

1. A handle device for a movable part, of a motor vehicle, having a support element,
    wherein a receptacle, which is configured to be arranged at an opening in the movable part, is formed on the support element,
    wherein a door handle, for actuating the movable part is mounted on the support element, and the door handle being configured such that there is a front gap between the opening in the movable part and the door handle, wherein a light conductor is arranged on the support element in order to indirectly illuminate the door handle through the gap, and wherein a sealing element is provided in the receptacle in order to seal the gap at least in the rest position of the door handle.

2. The handle device according to claim 1, wherein the door handle is mounted movably between at least two positions, namely:

a rest position, in which the door handle is received in the receptacle, in order to close the opening in the movable part with an outer surface of the door handle substantially flush with a lateral side of the movable part, and an actuating position in which the door handle is extended from the receptacle to actuate the movable part.

3. The handle device according to claim 1, wherein the light conductor is configured to be arranged along the gap.

4. The handle device according to claim 1, wherein the light conductor is arranged circumferentially around an outer surface of the door handle.

5. The handle device according to claim 1, wherein the light conductor has a loop region and two coupling regions extending from the loop region for light from at least one light source.

6. The handle device according to claim 1, wherein at least one or two light sources are provided in order to couple a light into the light conductor.

7. The handle device according to claim 1, wherein the light conductor is formed from a bundle of glass fibers or in the form of a light tube.

8. The handle device according to claim 1, wherein the light conductor is configured in such a way that at least part of a light coupled into the light conductor is emitted laterally, preferably from a lateral surface of the light conductor.

9. The handle device according to claim 1, wherein the light conductor has a surface structure on a lateral surface in order to reflect a part of a light coupled into the light conductor inwards into the light conductor and to allow a part of it to exit outwards from the light conductor.

10. The handle device according to claim 9, wherein the surface structure of the light conductor is at least in the form of a mirroring coating or a roughening or a notch structure or a serrated structure on a cladding surface of the light conductor.

11. The handle device according to claim 1, wherein the support element is configured in such a way as to reflect at least a part of a light, preferably with an albedo value of 0.5 to 0.9.

12. The handle device according to claim 1, wherein the sealing element is arranged along the gap.

13. The handle device according to claim 1, wherein the sealing element has a sealing lip, which, at least in the rest position of the door handle, elastically rests on the door handle.

14. The handle device according to claim 1, wherein the sealing element is arranged circumferentially around the lateral surface of the door handle.

15. The handle device according to claim 1, wherein the sealing element is configured in such a way as to receive the light conductor at least in a form- or force-fitting or material-fitting manner.

16. The handle device according to claim 1, wherein the sealing element has a reflection surface in order to reflect a light, at least in part, preferably with an albedo value of 0.5 to 0.9.

17. The handle device according to claim 1, wherein the sealing element, has a white or yellow color.

18. The handle device according to claim 1, wherein the sealing element is formed from a plastic material.

19. A method for illuminating a door handle for a movable part of a motor vehicle, having the handle device of claim 1, which has a support element, wherein a receptacle, which is configured to be arranged at an opening in the movable part, is formed on the support element, wherein the door handle for actuating the movable part is movably mounted on the support element, and the door handle being configured such that a front gap is configured to be set between the opening in the movable part and the door handle, and a light conductor, wherein the door handle is indirectly illuminated through the gap.

20. A handle device for a movable of a motor vehicle, having a support element, wherein a receptacle, which is configured to be arranged at an opening in the movable part, is formed on the support element, wherein a door handle for actuating the movable part is mounted on the support element, and the door handle being configured such that there is a front gap between the opening in the movable part and the door handle, wherein a light conductor is arranged on the support element in order to indirectly illuminate the door handle through the gap, wherein the light conductor is arranged circumferentially around an outer surface of the door handle;

wherein the light conductor is formed from a bundle of glass fibers or in the form of a light tube, and wherein the light conductor has a surface structure on a lateral surface, in order to reflect a part of a light coupled into the light conductor inwards into the light conductor and to allow a part of it to exit outwards from the light conductor.

21. The handle device according to claim 20, wherein the door handle is mounted movably between at least two positions, namely:

a rest position, in which the door handle is received in the receptacle, in order to close the opening in the movable part with an outer surface of the door handle substantially flush with a lateral side of the movable part, and an actuating position in which the door handle is extended from the receptacle to actuate the movable part.

22. The handle device according to claim 20, wherein the light conductor is arranged circumferentially around an outer surface of the door handle.

23. The handle device according to claim 20, wherein the light conductor has a loop region and two coupling regions extending from the loop region for light from at least one light source.

24. The handle device according to claim 20, wherein at least one or two light sources are provided in order to couple a light into the light conductor.

25. The handle device according to claim 20, wherein the light conductor is configured in such a way that at least part of a light coupled into the light conductor is emitted laterally, preferably from a lateral surface of the light conductor.

26. The handle device according to claim 20, wherein a surface structure on the lateral surface of the light conductor is an inhomogeneous surface structure.

27. The handle device according to claim 26, wherein the surface structure of the light conductor is in the form of a mirroring coating or a roughening or a notch structure or a serrated structure on a cladding surface of the light conductor.

28. The handle device according to claim 20, wherein the support element is configured in such a way as to reflect at least a part of a light, preferably with an albedo value of 0.5 to 0.9.

29. The handle device according to claim 20, wherein a sealing element is provided in the receptacle in order to seal the gap at least in the rest position of the door handle.

30. The handle device according to claim 29, wherein the sealing element has a sealing lip, which, at least in the rest position of the door handle, elastically rests on the door handle.

31. The handle device according to claim 29, wherein the sealing element is arranged circumferentially around the lateral surface of the door handle.

32. The handle device according to claim 29, wherein the sealing element is configured in such a way as to receive the light conductor in a form- or force-fitting or material-fitting manner.

33. The handle device according to claim 29, wherein the sealing element has a reflection surface in order to reflect a light at least in part, preferably with an albedo value of 0.5 to 0.9.

34. The handle device according to claim 29, wherein the sealing element has a white or yellow color.

35. The handle device according to claim 29, wherein the sealing element is formed from a plastic material.

* * * * *